United States Patent [19]
Fasano et al.

[11] Patent Number: 5,920,451
[45] Date of Patent: Jul. 6, 1999

[54] EARTH LEAKAGE CIRCUIT BREAKER ASSEMBLY

[75] Inventors: Michael Fasano, Watertown; David Parker, Manchester; Joseph Smith, Unionville, all of Conn.; Pierre Irissou, Sunny Vale, Calif.; Sergei Fedorjaczenko, Canton, Conn.

[73] Assignee: Carlingswitch, Inc., Plainville, Conn.

[21] Appl. No.: 08/924,390

[22] Filed: Sep. 5, 1997

[51] Int. Cl.$^6$ ...................................................... H02H 3/16
[52] U.S. Cl. ............................ 361/45; 361/102; 361/115; 335/18
[58] Field of Search ................................. 361/42, 44, 45, 361/102, 115, 93; 335/10, 18, 21, 22

[56] References Cited

U.S. PATENT DOCUMENTS

| | | | |
|---|---|---|---|
| 3,771,081 | 11/1973 | Strobel | 335/9 |
| 4,079,345 | 3/1978 | Pietsch | 335/10 |
| 4,347,488 | 8/1982 | Mune et al. | 335/9 |
| 5,264,811 | 11/1993 | Takeda | 335/18 |

*Primary Examiner*—Jeffrey Gaffin
*Assistant Examiner*—Michael J. Sherry
*Attorney, Agent, or Firm*—McCormick, Paulding & Huber

[57] ABSTRACT

A multi-pole circuit breaker assembly for interrupting AC power to a load upon the detection of an earth leakage fault or an overcurrent condition includes a pair of circuit breaker units mounted adjacent to an earth leakage module. The earth leakage module includes an electronic circuit that senses a current imbalance between the power line lead and the neutral line lead using a differential transformer. In response to a current imbalance greater than a predetermined value, the electronic circuit periodically energizes a switching circuit that provides power across a solenoid. The solenoid, when actuated, engages a common trip mechanism to open concurrently the contacts of the circuit breakers units. The common trip mechanism includes an elongated bar that extends through the casing of the earth leakage module and the circuit breaker units. The elongated bar engages a U-shaped trip member pivotally disposed in each circuit breaker. Each trip member has a depending member extending from a leg that trips its respective circuit breaker unit when pivoted upwardly by the solenoid.

39 Claims, 9 Drawing Sheets

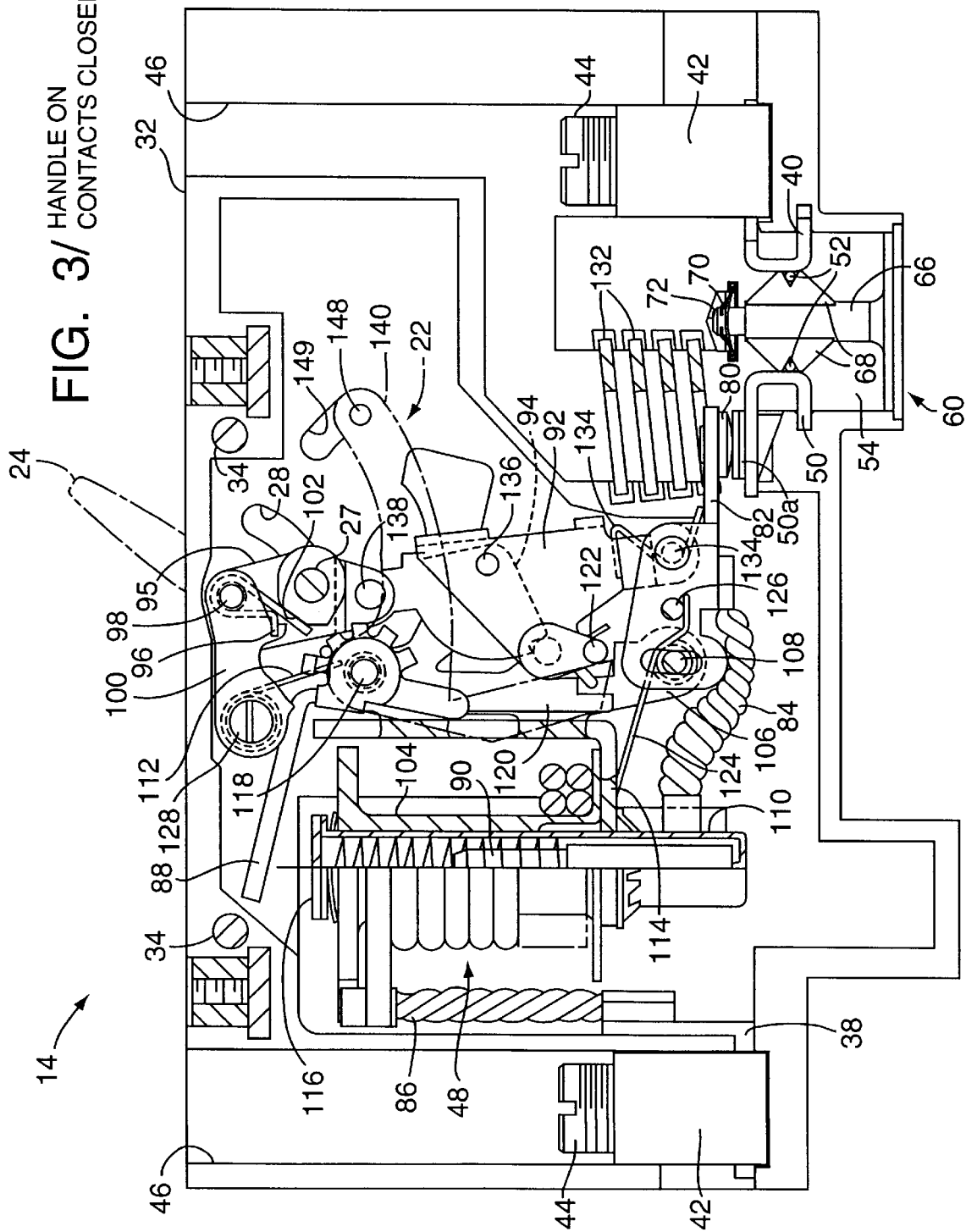
FIG. 3 / HANDLE ON CONTACTS CLOSED

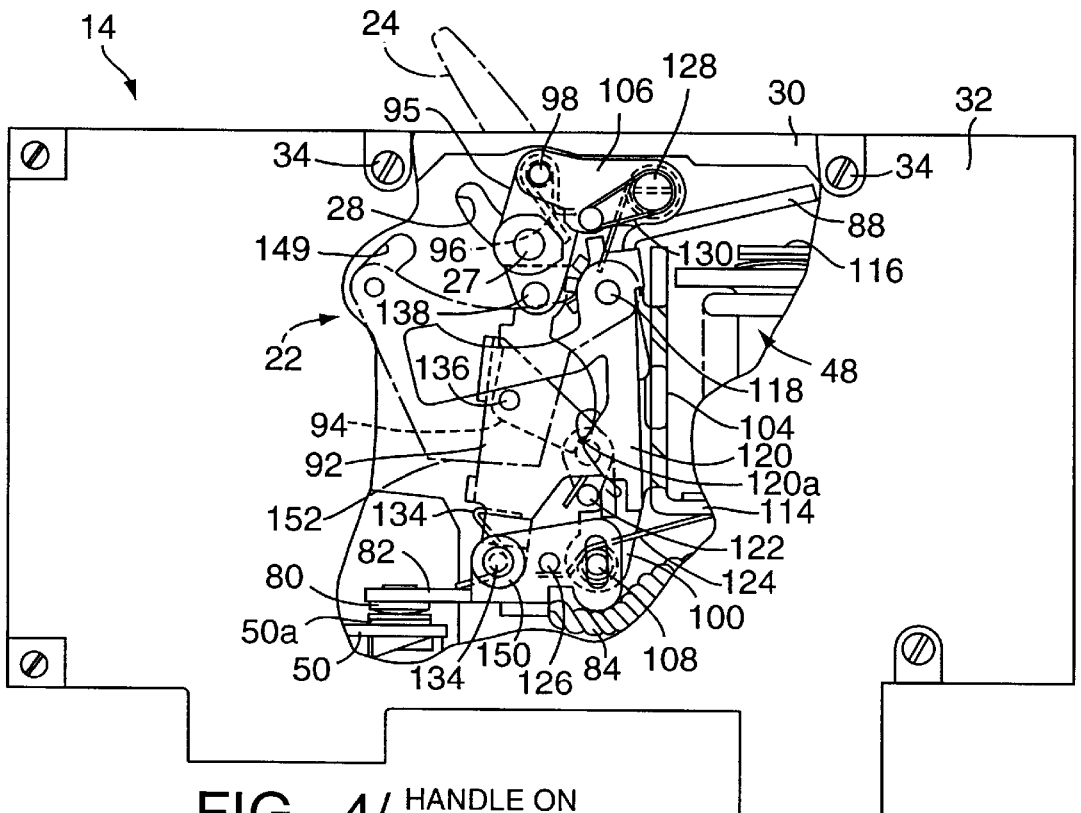
FIG. 4 / HANDLE ON CONTACTS CLOSED
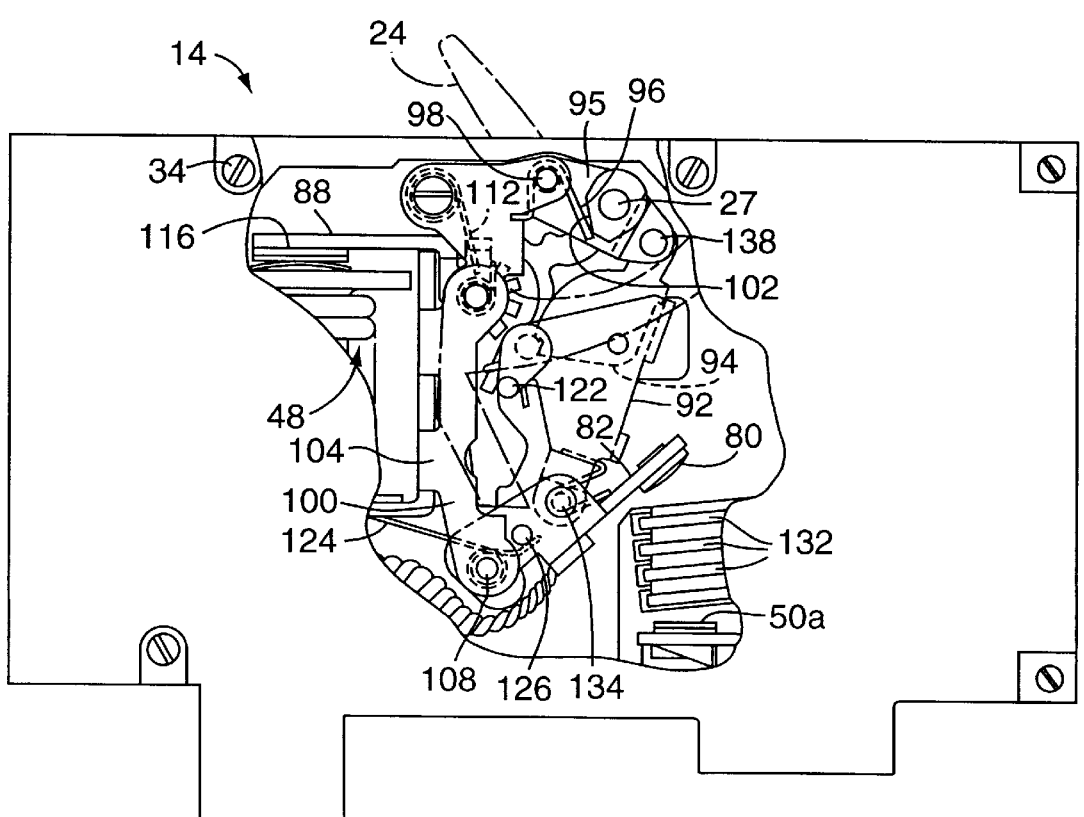
FIG. 5 / HANDLE OFF CONTACTS OPEN

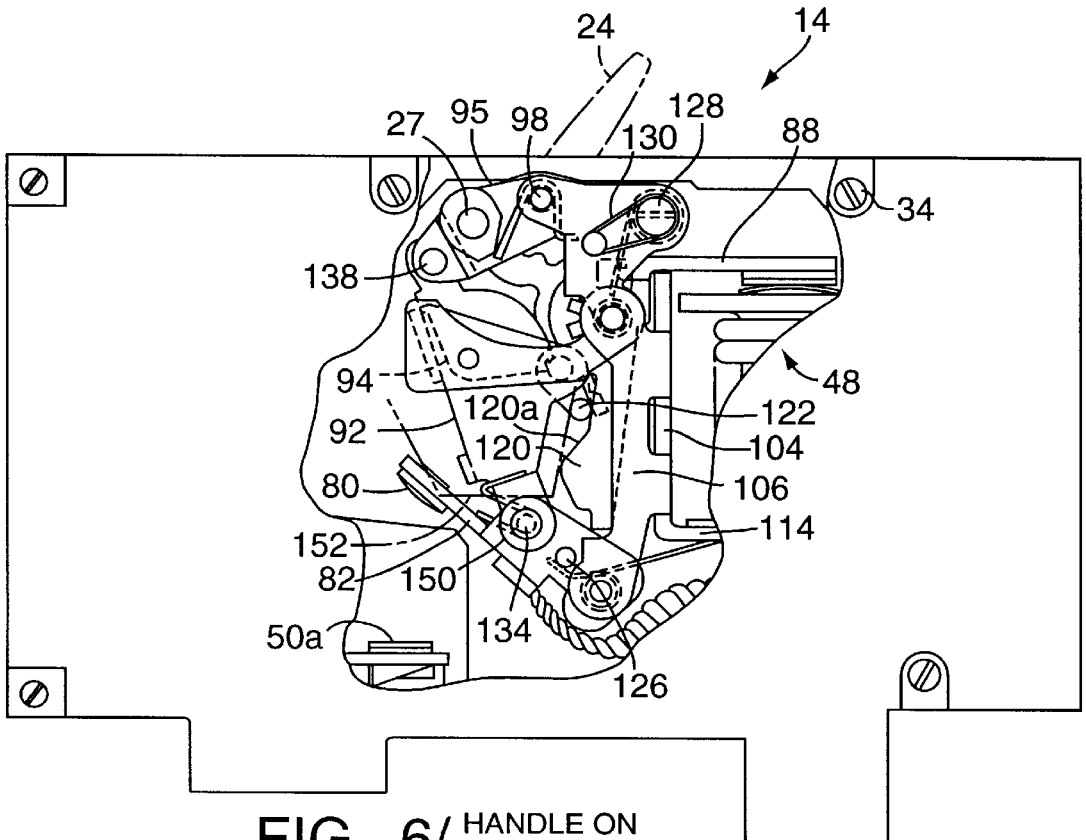
FIG. 6 / HANDLE ON CONTACTS OFF
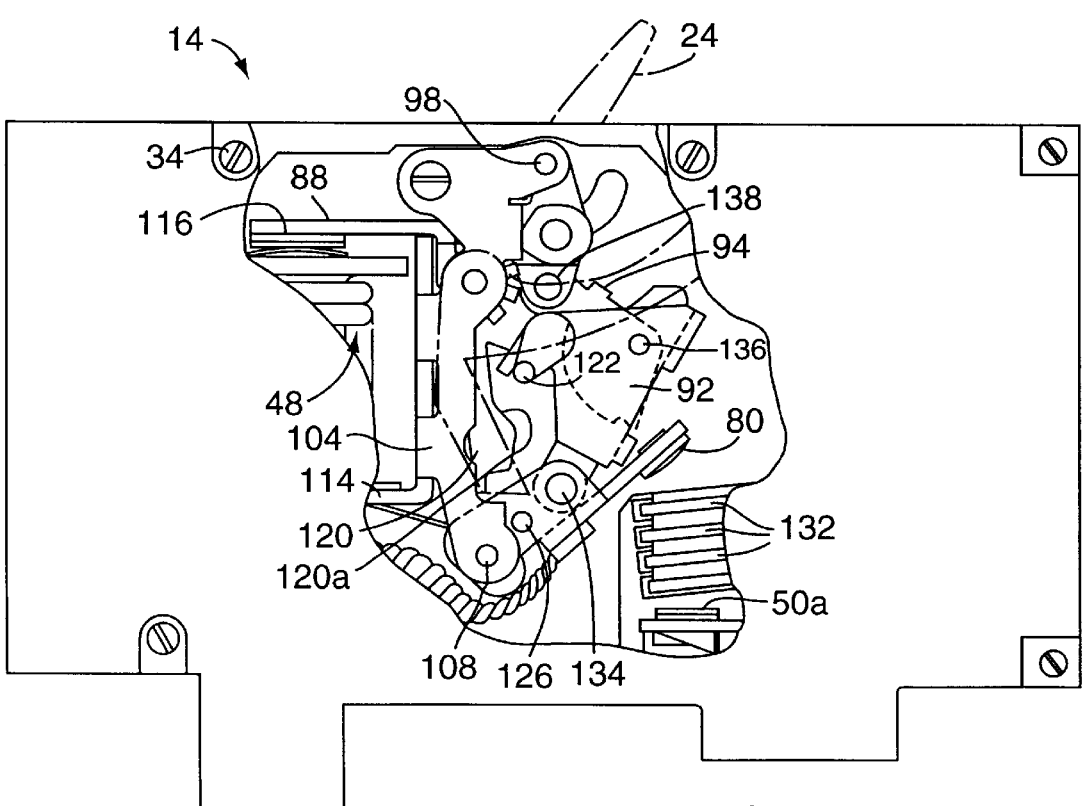
FIG. 7 / HANDLE ON CONTACTS OPEN

EARTH LEAKAGE CIRCUIT BREAKER ASSEMBLY

FIELD OF THE INVENTION

This invention relates generally to circuit breakers, and more particularly to circuit breaker assemblies having multiple circuit breakers and an earth leakage fault detection circuit for tripping the circuit breakers concurrently.

BACKGROUND OF THE INVENTION

Circuit interrupters or circuit breakers generally include a pair of contacts for conducting and interrupting electrical power to a load, and a detection circuit for sensing earth leakage faults and actuating a mechanism that opens the contacts upon the detection of a fault. A common detection circuit uses a current differential transformer having a secondary winding wound around an annular core. The power conductors and the neutral conductor pass through the annular core of the transformer to provide opposing primary windings. The secondary winding of the transformer provides an output signal representative of the imbalance of the current through the conductors. This imbalance is indicative of an earth leakage fault condition. When a fault condition is present, the detection circuit typically energizes a solenoid that actuates the circuit breaker mechanism to open the contacts. As shown in U.S. Pat. No. 4,598,331 to Legatti, the solenoid is connected in series with an SCR between the neutral conductor (or ground) and a DC power source. The detection circuit provides a signal to trigger the SCR to energize the solenoid. The current continues to conduct through the SCR and energize the solenoid until the contacts of the circuit breaker open, which removes the DC power source. A full-wave rectifier may be connected to the load side of the contacts of the circuit breaker to provide DC power to the detection circuit and solenoid.

A disadvantage of using an SCR to energize the solenoid is that the DC power source and detection must by connected to the load side of the contacts. This arrangement presents a problem when a fault condition is present before contacts are closed. The time it takes for the contacts to trip under such a condition is increased by the time needed to energize the circuit upon application of DC power to the detection circuit.

Another disadvantage of using an SCR is the limited amount of control of the current applied to the solenoid. The current applied to the solenoid through the SCR is dependent upon the time to open the contacts. Any change in the actuation time of the contacts or any sticking of the contacts may damage the solenoid and detection circuit. This is especially true for circuit breakers adapted to interrupt high voltages. Furthermore, the tripping of the circuit breaker assembly removes and therefore, does not allow for any indication of the type of fault detected after the circuit breakers have tripped.

Generally multi-pole circuit breakers include a common trip mechanism for interconnecting a set of circuit breakers such that tripping one will trip concurrently the other circuit breakers. U.S. Pat. No. 4,347,488 to Mune et al. shows a multi-pole circuit breaker having such an arrangement. Each circuit breaker includes a tripping member for releasing a resettable mechanism to open a movable contact. Each pair of tripping members are interconnected by a coupler disposed within a recess defined by the abutting side walls of two adjacent circuit breakers. The trip member is generally U-shaped with one leg engageable with the resettable mechanism.

The disadvantage of this common trip mechanism is it includes a number of small pieces which makes it more costly to manufacture and assemble. Furthermore, the coupler engages the trip member about its pivotal axis, and thus requires relatively high forces to pivot the trip member which may delay the actuation of the trip mechanism. The coupler also does not provide a convenient means to actuate the trip mechanism for an earth linkage detection circuit.

Accordingly, it is an object of the present invention to provide a circuit breaker assembly that improves the reaction time for tripping a circuit breaker in response to an earth leakage fault condition.

It is another object to provide a circuit breaker assembly that minimizes power dissipation of an earth leakage module adapted to open the circuit breakers in response to an earth leakage fault condition.

It is a further object to provide a circuit breaker assembly that provides a continuous fault indication representative of the type of fault condition that tripped the circuit breaker assembly.

It is yet another object to provide a circuit breaker assembly that includes means for tripping the circuit breaker assembly in a safe, controlled manner, especially for circuit breakers that interrupt high voltages.

SUMMARY OF THE INVENTION

According to the present invention, a trip mechanism is provided for tripping a of circuit breaker unit of a circuit breaker assembly. The circuit breaker unit includes a pair of cooperating contacts one of which is movable relative to the other contact by a toggle mechanism, and a tripping device responsive to current fault conditions to release the toggle mechanism. The circuit breaker unit further includes a latch means for preventing the toggle mechanism from functioning. The circuit breaker assembly has a handle for actuating the toggle mechanism of the circuit breaker for "opening" and "closing" the contacts.

The trip mechanism comprises a U-shaped trip member having two legs interconnected by a cross member at one end thereof. One leg of the trip member has a depending member that engages the toggle mechanism. Each trip member is pivotally attached to the toggle mechanism device at the other end portions of the legs. The cross member has an engagement means for receiving an elongated bar. An actuation means engages the bar to pivot the trip member to disable the toggle mechanism in response to a fault condition.

In another embodiment of the present invention, a circuit breaker assembly for providing AC power to a load comprises a plurality of circuit breaker units. Each unit includes a pair of cooperating contacts one of which is movable relative to the other contact by a toggle mechanism, a tripping device responsive to current fault conditions to release the toggle mechanism, and a latch means for preventing the toggle mechanism from functioning. The circuit breaker assembly further includes a handle for actuating the toggle mechanisms of each of the circuit breakers for "opening" and "closing" the contacts.

The circuit breaker assembly for providing AC power also includes a common trip mechanism having a U-shaped trip member for each circuit breaker unit. Each of the trip members have two legs interconnected by a cross member at one end of said legs. One leg of the trip members has a depending member for engaging the toggle mechanism. Each trip member is pivotally attached to the toggle mechanism device at the other end portions thereof. Each cross member having an engagement means for receiving an elongated bar. The bar is moved by an actuation means to rotate simultaneously each of the trip members to disable the toggle mechanisms in response to a fault condition.

In yet another embodiment, an earth leakage detection unit is provided for a circuit breaker assembly having a circuit breaker unit. The circuit breaker unit has a pair of cooperating contacts one of which is movable relative to the other contact for providing AC power to a load. The circuit breaker unit further includes a trip mechanism for opening the contacts. The circuit breaker assembly includes a handle for "opening" and "closing" the contacts of the circuit breaker.

The earth leakage detection unit comprises a solenoid for actuating the trip mechanism in response to an earth leakage condition, and a current transformer for providing an output signal representative of the current imbalance between power leads and a neutral lead from the AC power source. The detection unit also has a detection circuit for providing an output signal representative of a current imbalance between the leads, and an oscillator circuit for providing a pulse train signal when the current imbalance is greater than a predetermined level. The solenoid is activated by a switching circuit in response to the pulse train signal.

In another embodiment of the present invention, an earth leakage detection unit including a solenoid, a current transformer and a detection circuit similar to that described hereinbefore. The detection unit further includes a switching circuit for activating the solenoid in response to the output signal for a limited time period to enable high voltage AC power to energize the solenoid.

In another embodiment of the present invention, a retaining device is provided for securing a pair of terminals within a circuit breaker. The terminals have a pair of substantially parallel contact surfaces spaced a predetermined distance apart. The circuit breaker has an opening in its casing adjacent the terminals. The retaining device comprises a base, a post extending from an upper surface of a base, and a pair of diametrically opposed fins extending from the post. The outer surface of each fin is spaced apart a predetermined distance for engaging the contact surfaces of the terminals for securing the terminals to the circuit breaker. The retaining device further includes a locking means for securing the retaining device to the circuit breaker.

BRIEF DESCRIPTION OF THE DRAWINGS

FIG. 3 is a side elevational view of a circuit breaker module incorporating the present invention, with the half-case of the circuit breaker being removed to show the internal parts of the circuit breaker, the contacts being shown in a closed condition when the handle is in the "on" position.

FIG. 4 is a view similar to FIG. 3 but taken from the opposite side of the same circuit breaker and with only a portion of the half case being shown broken away to reveal the internal parts of the mechanism.

FIG. 5 is a view similar to FIG. 3 but with only a portion of the half case broken away to reveal the internal parts of the breaker mechanism, the contacts being shown in FIG. 5 in an open condition, when the handle in its "off" position.

FIG. 6 is a view similar to FIG. 5 but taken from the reverse side to reveal the various internal parts in the same condition as depicted in FIG. 5 but from the opposite side for purposes of comparison with FIG. 4.

FIG. 7 is a view similar to FIG. 5 when the handle has been moved to its "on" position without effecting the open condition of the contacts.

DETAILED DESCRIPTION OF THE PREFERRED EMBODIMENTS

Figure 1:
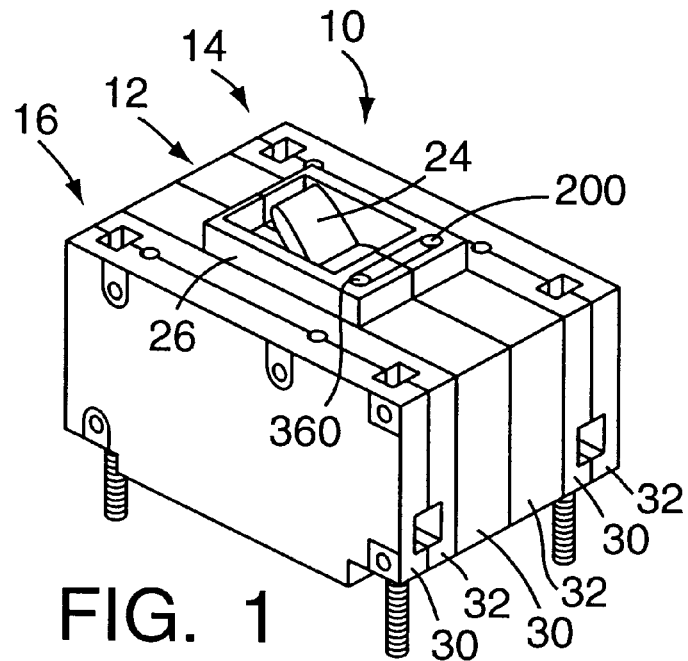
FIG. 1 is a perspective view of a preferred embodiment of a circuit breaker assembly in accordance with the present invention.

FIG. 1 illustrates a single phase, multi-pole circuit breaker assembly, generally designated 10, embodying this invention adapted for interrupting AC power to a load upon detection of earth leakage fault or an overcurrent condition. The circuit breaker assembly comprises an earth leakage module 12 and a pair of identical circuit breaker poles or modules 14,16 mounted adjacent to the earth leakage module.

Figure 2:
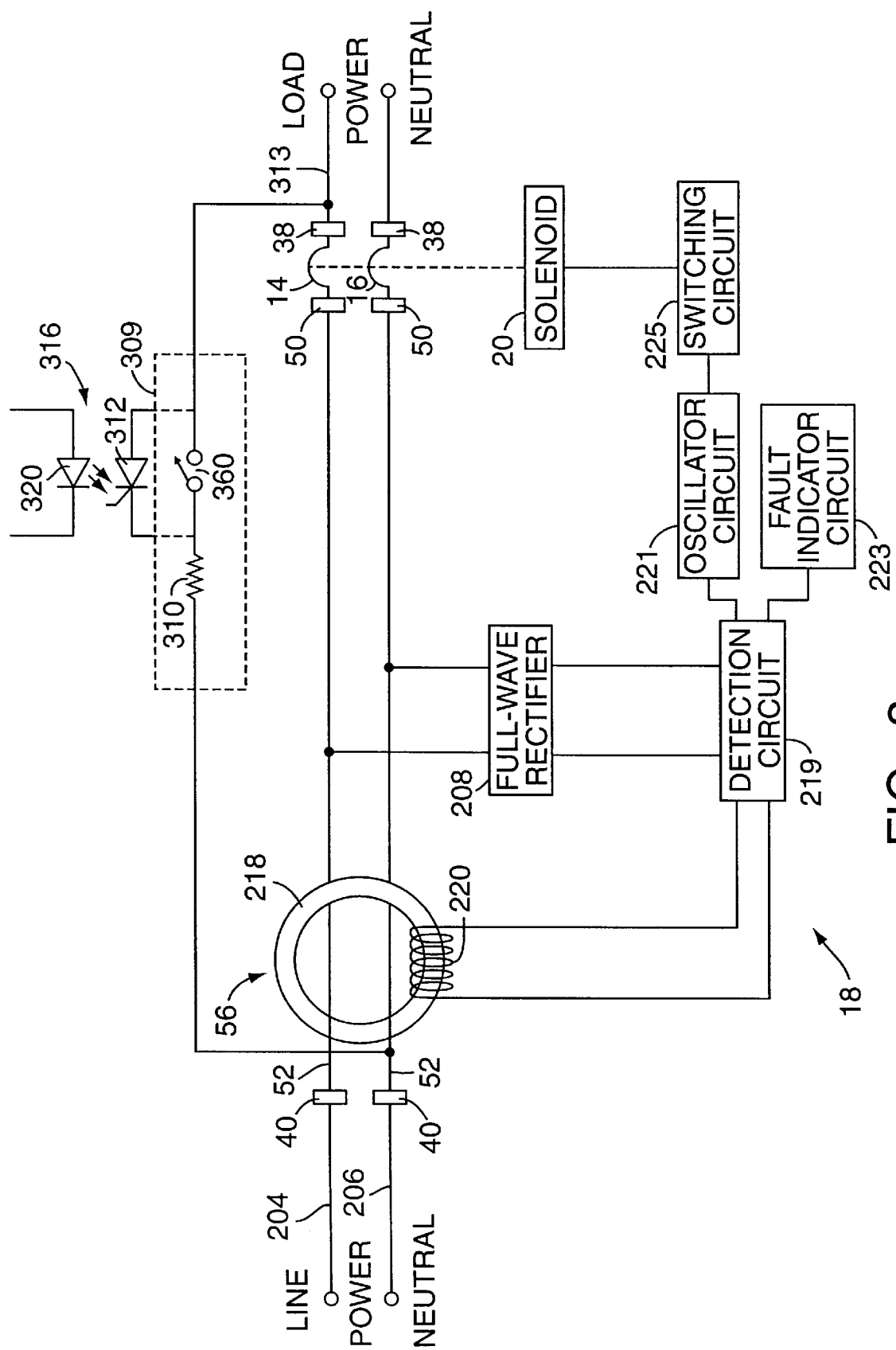
FIG. 2 is a schematic functional diagram of the circuit breaker assembly in accordance with the present invention.
Figure 9:
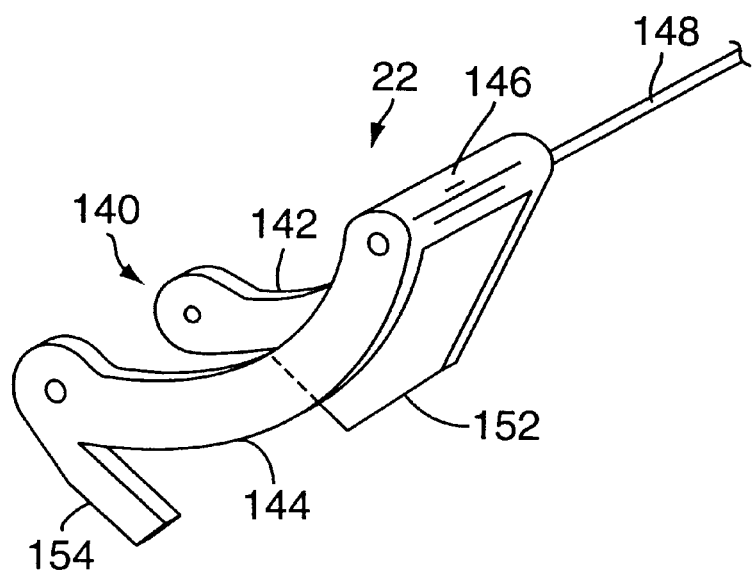
FIG. 9 is an expanded, front perspective view of a trip member of the circuit breaker of FIG. 3.

The circuit breakers 14,16 provide AC power to the load when the circuit breaker mechanism is mechanically actuated to a "closed" position. The circuit breaker unit 14 interrupts the power line lead or conductor and circuit breaker unit 16 interrupts the neutral line lead. The circuit breakers are adapted to "open" or trip when the current passing therethrough exceeds a predetermined value. As shown in FIG. 2, the earth leakage module 12 provides a detection circuit 18 and solenoid 20 for tripping the circuit breakers when an earth leakage fault condition is sensed. Referring to FIG. 9, the circuit breaker assembly 10 also includes a common trip mechanism 22 for simultaneously tripping each of the circuit breakers when an overcurrent condition and/or an earth leakage fault is detected. Furthermore, in FIGS. 1 and 3 the circuit breaker assembly 10 is actuated by a single handle 24 disposed in a boss 26 in the earth leakage module 12 that "opens" and "closes" simultaneously the circuit breakers 14,16. The handle 24 is interconnected to each of the adjacent circuit breaker modules by a bar 27 that passes through arcuate slots 28 disposed in the walls of the circuit breakers and the earth leakage module.

As shown in FIG. 1, each of the circuit breaker modules 14,16 and the earth leakage device 12 comprise a split case having two halves 30,32 conventionally assembled to one another by longitudinally extending fasteners 34 (FIG. 3) which extend through aligned openings in the earth linkage device and the pair of adjacent breaker cases. These case halves 30,32 are preferably molded from an insulating material such as polymeric material.

As shown in FIG. 3, each circuit breaker module has a pair of outer terminals 38 and 40. Each terminal includes a frame 42 having a threaded bore for receiving a set screw 44 for clamping a wire to the terminals. The case halves 32 have channels 46,46 that provide access to the set screws 44,44 to permit tightening of the set screws 44,44. Terminal 38 provides the electrical connection for the load to an electromagnetic coil 48. Terminal 40 provides an electrical connection to a terminal 50 having a fixed contact 50a for the circuit breaker. The outer terminal 40 provides the electrical connection for the power line lead to the terminal 50 by an insulated wire 52 that passes through a cutout portion 54 of the circuit breaker case, adjacent the line terminals 40, 50, to the earth leakage module 12. The insulated wires 52, 52 of each circuit breaker passes through a current differential transformer 56 to an earth leakage detection circuit 18 (see FIG. 2) and back to the stationary contact terminal 50 of the respective circuit breaker 14,16.

Figure 8:
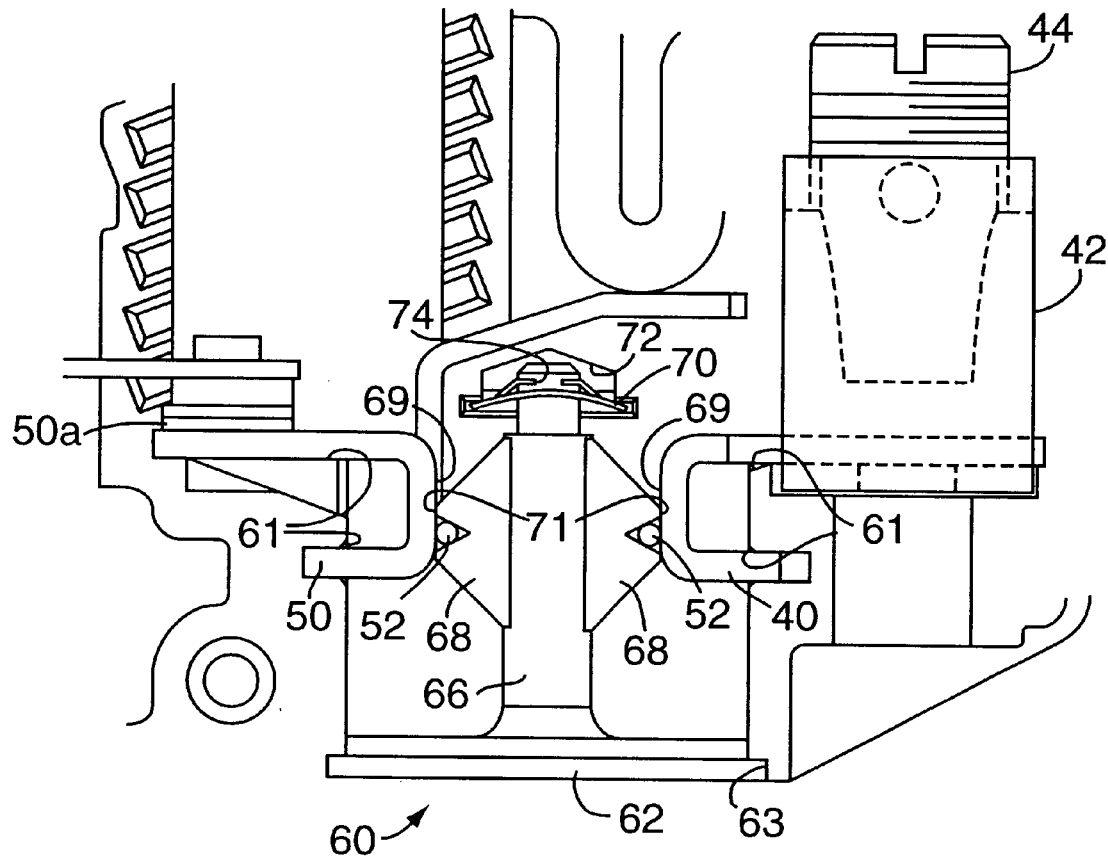
FIG. 8 is an expanded, side elevational view of a retainer device of the circuit breaker of FIG. 1.

As best shown in FIG. 8, the ends of the insulated wires 52,52 are secured to the inner surface of the J-shaped line terminals 40, 50. The ends of the J-shaped line terminals are fitted with a pair of slots 61,61 disposed in the casing of the circuit breaker. A retaining device 60 is secured between engagement surfaces 69 of the line terminals 40,50 for maintaining the terminals in a fixed position. This method of securing the line terminals within the circuit breaker permits the line terminals to be easily attached to the wires 52, 52 and secured within the circuit breaker through a rectangular opening 63 in the casing after the circuit breaker has been assembled.

The retainer 60 comprises a stepped rectangular base 62 dimensioned to cover the rectangular opening 63 of the circuit breakers 14,16. A post 66 extends upwardly from the base and is centrally disposed between the line terminals 40,50 when the retainer is secured to the circuit breaker. The retainer 60 includes a pair of triangular fins 68,68 that are disposed diametrically opposed on the post 66. The apex 71,71 of the fins are adapted to engage the engagement surfaces 69,69 of the line terminals to retain them in place. The retainer 60 is formed of polymeric material to electrically insulate the line terminals.

The retainer 60 is secured to the circuit breaker 14 by a plate 70 that is maintained within a recess 72 formed within the casing halves 30,32 of the circuit breaker. The plate is formed of metallic material and has a circular opening 74 having a diameter slightly less than the diameter of the post 66. The retainer 60 is secured to the circuit breaker by snapping or forcing the upper end of the post into the opening 74 of the plate 70.

Turning next to a description of the mechanism provided inside the circuit breaker case, shown in FIGS. 3–7, a movable contact 80 is provided on a movable contact arm 82 and is engageable with the stationary contact terminal 50. A flexible lead 84 is provided between the movable contact arm 82 and the lower end of the coil 48 whereas a lead 86 of similar material is provided between the load terminal 38 and the upper end of coil 48. The mechanism to be described is generally similar to that disclosed in U.S. Pat. Nos. 2,360,922 and 4,347,408; and serves to trip these contacts 50a and 80 to the open condition upon predetermined current overloads by reason of the electromagnetic force generated in the coil 48 serving to move armature 88 from the position shown in FIG. 3 to that shown in FIG. 5. A movable core 90 is spring biased downwardly inside the coil 48 as shown in FIG. 3, said plug 90 being magnetically moved upwardly against the force of the spring to magnetically attract the armature 88 in response to such an over current condition.

The contact arm 82 is biased toward the position shown in FIGS. 5 and 6 (that is toward the switch open condition) and is adapted to be mechanically closed by means of the handle 24 of the earth leakage module 12 as a result of moving the handle from the position shown in FIGS. 5 and 6 to that shown in FIGS. 3 and 4. This closing motion for the contacts is achieved through a three bar linkage consisting of the movable contact arm 82, a collapsible link (consisting of a toggle comprising elements 92 and 94) and a crank arm portion 95. The crank arm portion 95 is biased by reset spring 96 wound on pivot pin 98 and having a fixed leg engaging the frame plate 100 and a movable leg engaging abutment 102 on crank arm 95.

The electromagnetic coil 48 is supported in a fixed frame 104, said frame having parallel integrally formed plates 100 and 106 best shown in FIGS. 4 and 6. The pivot pin 108 extends between the lower end portions of these plates 100 and 106 to pivotally support the movable contact arm 82. An upper pivot pin 98 extends through upper portions of these plates 100 and 106 to pivotally support the integrally formed depending crank 95. The entire frame forms a part of the electromagnetic device, which device further includes a metal tube 110, housing the spring biased movable magnetic core 90 described above, such that the movable core is retarded by the action of a suitable fluid in order to provide a time delayed tripping of the mechanism at predetermined overload current conditions. A spring 112, to be described, is adjustable to preset the breaker to trip at a predetermined level of electromagnetic force in coil 48 (and consequently at a predetermined overcurrent condition).

The frame also has a horizontal leg 114 supporting the coil 48, which coil is wound on an insulating spool or bobbin in a conventional fashion. The frame is of magnetically conductive material and a pole piece 116 of the same material may be provided in the non-magnetic bobbin to improve the magnetic conductivity between these fixed elements and the armature.

Turning more particularly to a description of the toggle mechanism defined by the collapsibly connected links 92 and 94, the reader is referred to the disclosure in the above mentioned U.S. Pat. No. 2,360,922 for a more complete description of this aspect of the subject disclosure. However, the following description of the operation of the circuit breaker mechanism is offered for purpose of clarity. As mentioned above, movement of the handle 24 of the earth leakage module 12 from the "on" to the "off" positions (shown in FIGS. 3 and 5 respectively) will cause the collapsible toggle defined by the links 92 and 94 to move as a unit such that the circuit breaker acts as a switch in being closed. For achieving opening movement, the handle is moved from the FIG. 5 to the FIG. 3 position and again the toggle links 92 and 94 move as one, being held in place by latch means to be described. Upon the occurrence of a predetermined overload condition, assuming the circuit breaker to have its contacts pre-positioned to the closed condition of FIGS. 3 and 4, the magnetizable armature 88 is attracted toward the pole piece 116 either after a time delay period or virtually instantaneously, depending upon the design overload current condition. The armature 88 is pivotally mounted and can move toward the pole piece 116 on a pin 118, which pin is secured to the frame plates 100 and 106 described above. Thus, the armature is located between these two plates, and attraction between the pole piece 116 and the armature 88 will cause the depending leg 120 of armature 88 to pivot clockwise as viewed in FIGS. 4 and 6 (counterclockwise as viewed in FIGS. 2 and 5). This depending portion 120 of the armature is adapted to engage a projecting pin 122 forming a part of latch means designed to cause the collapsible link defined by the members 92 and 94 to move in unison from the latched position as shown in FIGS. 3 through 6 to the collapsed (unlatched) position shown in FIG. 7. The pin 122 will move generally vertically from the position shown for it in FIG. 4 to that shown for it in FIG. 6 as a result of spring pressure acting on the movable contact arm 82. This spring pressure is provided chiefly from main spring 124 acting between the underside of frame member 110 and a pin 126 provided in the contact member 82. The contact arm 82 has laterally spaced vertical plates integrally formed therein to define openings for its own pivot pin 108 and said pin 126.

Means is provided for adjusting the spring force necessary to trip the circuit breaker as a result of the current overload necessary to actuate the tripping device described above, and preferably said adjustment is provided in the form of a slotted pin 128 having the coil spring 112 wound thereon between the plates 100 and 106 of the frame with one end of the spring being provided in a slot of said pin and the other end engaging the armature 88. The reader is referred to the 1963 Schwartz et al U.S. Pat. No. 3,079,479 for a more complete description of such adjustment means. The opposite end of said pin 128 has a friction spring 130 wound around it as best shown in FIGS. 4 and 6 so to retain whatever adjustment is preset by this pin 128.

To extinguish arcing caused by opening of the contacts 50a and 80, a stacked array of metal plates 132,132 are supported within and by the two half cases 30,32 of the circuit breaker as best shown in FIGS. 3 and 5.

The collapsible link defined by members 92 and 94 have an internal spring to create a normal condition for said link members whereby they simply define a third bar for the three bar linkage described above. Thus, the collapsible link (92 and 94) together with the depending crank portion 95, combine to provide a slight overcenter condition as viewed in FIGS. 3 and 4 (that is when the breaker is closed) and this spring 134 serves to hold the collapsible link (or third bar of the linkage defined by the links 92 and 94) in this same condition when the circuit breaker mechanism is moved to the "open" position depicted in FIGS. 5 and 6. The function of this-collapsible link or toggle will be described in greater detail hereinbelow with reference to FIG. 7 wherein these link elements 92 and 94 are unlatched by suitable means to be described, including the pin 122 associated with latch means carried by the collapsible link itself.

As best shown in FIG. 7, the contact arm 82 is in the switch "open" condition but handle 24 is "on". The collapsible link has been unlatched however, and this condition would be caused by an overload condition even with the handle held or restrained in the "on" position. In this situation the toggle collapses independently of the handle position providing "trip free" breaker operation.

Still with reference to FIG. 7, the collapsible toggle formed by the interconnected links 92 and 94 shown in its collapsed condition, and by way of comparison to FIG. 3, the pivot pin 134 on contact arm 82 is shown in FIG. 3 as being generally in line with pin 136 provided between the toggle links 92 and 94 and with the pivot pin 138 on the crank arm 95. By way of contrast in FIG. 7 the toggle pivot 136 is displaced to the right with respect to this line between pivot pin 134 on contact arm 82 and pivot pin 138 on crank arm 95. The pin 122 for the latch means described above is ineffective in the "trip free" configuration illustrated in FIG. 7. However, as long as the armature remains in the position shown in FIG. 7 (that is energized) movement of the handle 24 from the "on" position shown to the "off" position (not shown) will result in return of the toggle to its latched position, but return movement of the handle 24 to the "on" position shown in FIG. 7 will recollapse the toggle to the position shown as a result of engagement between the pin 122 and a ramp surface 120a defined for this purpose on depending leg 120 of the armature 88. It should be recalled that pin 122 tends to move generally vertically between the position shown for it in FIGS. 3 and 5. The FIG. 7 position for this pin 122 corresponds quite closely to that illustrated in FIG. 5 (that is to the upper position for this pin).

As best shown in FIG. 9, the unique common trip mechanism 22 includes a generally U-shaped member 140 for use with each of the circuit breaker mechanisms. The legs 142, 144 of the trip member 140 are adapted to be located adjacent the inside walls of each case. The ends of the legs 142,144 are interconnected by a tubular cross member 146 adapted to receive an elongated bar 148. The other ends of the legs are pivotally connected to pin 112. The legs 142, 144 are curved upwardly and away from the pivot pin 112 to reduce the stress and fatigue at the pivot portion of the legs. A cam follower roller 150 (FIG. 6) is provided on the pivotable contact arm 82 such that this roller is adapted to engage a portion of leg 142 of the trip member 140, such portion being indicated generally at 152 in FIGS. 6 and 9. Leg 144 includes a downwardly extending member 154 forming a generally inverted V-shape best shown in FIG. 9. Member 154 of leg 144 is engageable with the pin 122 to cause the breaker to trip as a result of pivoting the trip member upward.

Each circuit breaker has its own U-shaped trip member 140 provided therein, and these trip members are connected to one another by the elongated bar 148. The trip bar extends to each of the circuit breakers and the earth leakage module through aligned arcuate slots 149 disposed in their respective case halves 30,32.

Referring to FIG. 3, an arcuate slot 28 is provided in each of the abutting case halves 30,32. These slots are aligned with one another and serve to provide a path of movement for a second elongated bar 27. The bar 27 extends through openings provided in the boss of each of the crank arms 95 for each of the circuit breakers and handle of the earth leakage module, with the result that each of the three crank arms 95,95 are required to move together, and in unison with one another. It is an important feature of the present invention that only the earth leakage module defines a boss 26, which boss has a handle 24 movably mounted therein in order to provide control over the position of the internally linked or interconnected handle crank portions 95 in each of the adjacent circuit breakers. Thus, the circuit breaker mechanisms shown in FIG. 1 are adapted to be turned "on" or "off" in unison by means of the single projecting handle 24.

Turning now to the earth leakage module 12 shown in FIGS. 1 and 2, the module includes a circuit 18 that actuates a solenoid 20 upon the detection of earth leakage fault on the power line. The solenoid, when actuated, raises the trip bar 148 (see FIG. 9) which opens concurrently the movable contact 82 of each of the circuit breakers 14,16 as described above. The force required to raise the bar 148 and pivot each of the U-shaped members is minimal as a result of the lever action provided by the bar 148 disposed a substantial distance from the pivot axis. The circuit 18 also energizes an indicator 200, such as a light emitting diode (LED), upon the detection of an earth leakage fault. The indicator is disposed in the boss 26 and visible to the operator. The earth leakage module 26 further includes a circuit test switch 360 disposed in the boss 26. The actuation of the test switch 360 creates a current imbalance through the differential transformer which trips the circuit breakers 14,16, to be described in greater detail hereinafter.

Figure 10:
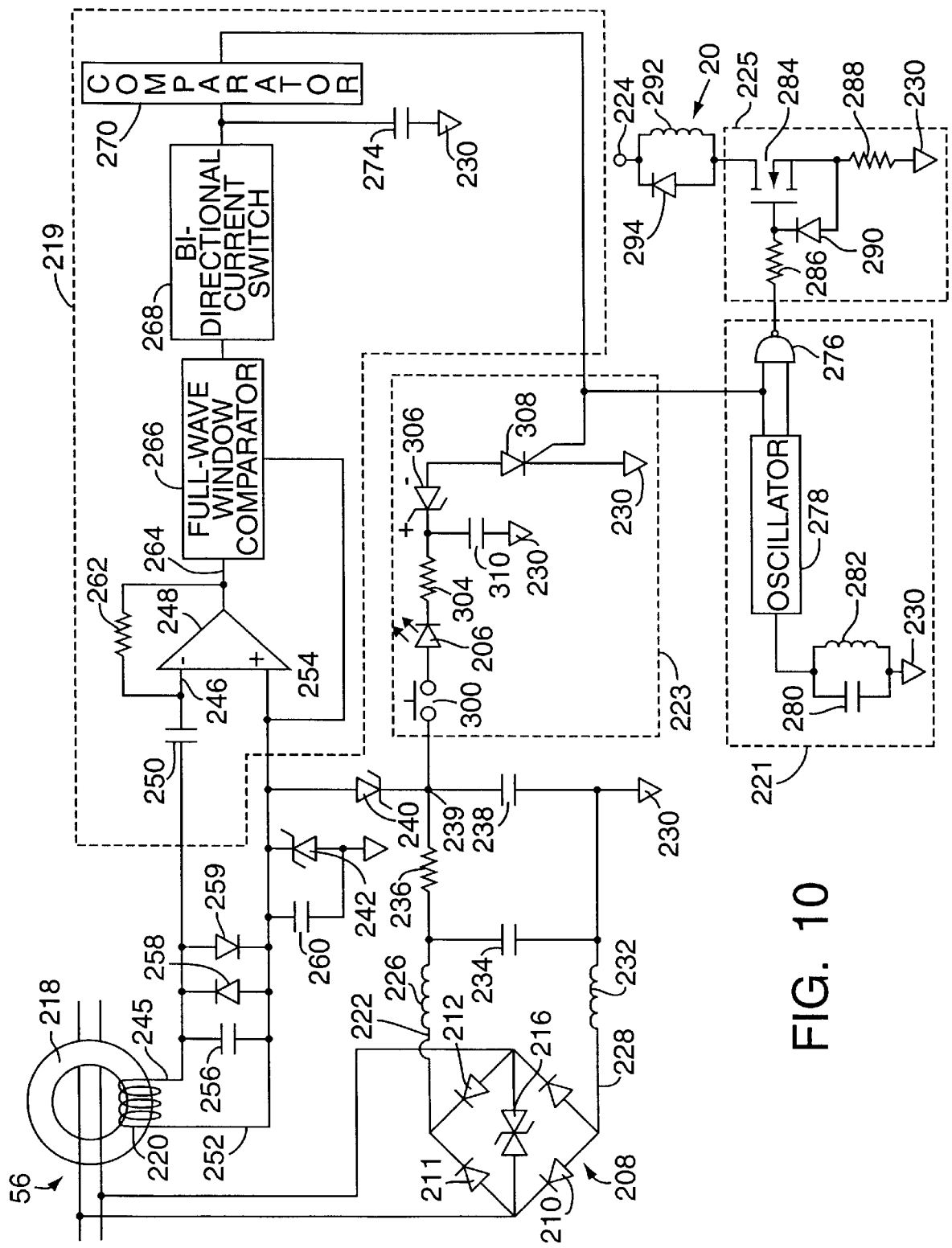
FIG. 10 is a schematic diagram of a earth leakage module of the circuit breaker assembly of FIG. 1.

Referring to functional diagram shown in FIG. 2 and FIG. 10, the power line lead 204 and neutral line lead 206 are connected to the line terminals 40,40 of each respective circuit breaker 14,16. The line leads are then connected to the input of a full-wave rectifier 208 and the stationary contact terminals 50,50. The full-wave rectifier provides at its output a rectified AC voltage to the solenoid 20 and DC power for the circuit. The rectified AC line voltage is approximately 170 volts peak for a 120 volts line voltage, 310 volts peak for a 220 volts line voltage, or 650 volts peak for a 460 volts line voltage. As shown in FIG. 10, the full-wave rectifier 208 comprises diodes 210–213 and a metal oxide varistor (MOV) 216 across the power line lead 204 and the neutral line lead 206 of the full-wave rectifier 208. The line leads 204,206 pass through the current differential transformer 56 comprising an annular core 218 and a secondary winding 220 disposed thereabout.

The secondary winding 220 of the differential transformer 56 provides an output signal to the detection circuit 219 that is proportional to the current differential between the power line lead 204 and the neutral line lead 206. In response to a differential output signal greater than a predetermined level, the detection circuit 219 provides a "high" output signal to an oscillator circuit 221. The oscillator circuit provides a periodic signal to a switching circuit 225 that provides the rectified AC power across the terminals of the solenoid 20 in accordance with the duty cycle of the output of the oscillator circuit. The solenoid then actuates and raises the elongated bar 148 and trips each of the circuit breakers 14,16 simultaneously. A fault indicator circuit 223 also provides a signal to illuminate the LED 200 in response to a current imbalance of the line leads 204,206 greater than a predetermined level.

Referring to the detailed schematic in FIG. 10 of the circuit 18, the positive output terminal 222 of the full-wave rectifier 208 is connected to junction 224 through current limiting inductor 226. Similarly, the negative output 228 of the full-wave rectifier is connected to common ground 230 through current limiting inductor 232. A filter capacitor 234 is connected between junction 224 and common ground 230. The AC rectified voltage across the filter capacitor 234 is approximately 170 Vpeak at a line voltage of 120 volts, approximately 310 volts peak at a line voltage of 220 volts, and approximately 650 Vpeak at a line voltage of 460 volts. The AC rectified voltage is connected to common ground through resistor 236 and capacitor 238 connected in series. The junction 239 between resistor 236 and capacitor 238 is clamped to approximately 28.5 volts by a pair of zener diodes 240,242 connected in series to common ground. The clamped voltage at junction 244 between the zener diodes 240,242 is approximately 13.5 volts.

The positive terminal 245 of the secondary winding 220 of the differential transformer 56 is connect to the inverted input 246 of an operational amplifier 248 through capacitor 250. The negative terminal 252 of the secondary winding 220 is connected to the non-inverting input 254 of the amplifier 248 which is also clamped to approximately 13.5 volts at junction 244. Capacitor 256 and clamping diodes 258,259 are connected in parallel to the secondary winding 220. Capacitor 260 is connected in parallel to zener diode 242. Resistor 262 is connected between the inverting input 246 of the amplifier 248 and its output 264. Resistor 262 may be varied to adjust the voltage to current conversion performed by the amplifier 248 which in turn adjusts the nominal trip current of the detection circuit 219.

The output 264 of the amplifier 248 is connected to a full-wave comparator 266 having a threshold voltage of ±6.7 volts. The output of the full-wave comparator 266 is provided to a bi-directional current switch 268. The output of the current switch 268 is provided to a comparator 270 by lead 272 which is connected to common ground 230 through capacitor 274. The comparator 270 has a large hysteresis which provides a high output signal when the output of the bi-directional current switch 268 greater than 7.5 volts.

The output of the comparator 270 is provided to nand gate 276 and oscillator 278. The oscillator 278 provides a positive pulse signal at a frequency of 1–2 Hertz having a pulse width of approximately 10–12 msec to a second input of the nand gate 276. The frequency and duty cycle of the pulse is determined by the RC time constant and values of capacitor 280 and resistor 282 connected in parallel. The nand gate 276, in response to the input signals, provide an inverted oscillator signal if the output signal of the detection circuit is "high".

The output of the nand gate 276 is provided to the input of the switching circuit 225 comprising a power MOSFET 284, a pair of current limiting resistors 286,288 and a diode 290 connected between the gate and source of the MOSFET. The MOSFET is preferred for its low power consumption characteristics which is critical when switching very high currents. The source of the MOSFET 284 is connected to common ground through resistor 288 and the drain of the MOSFET is connected to the coil 292 of the solenoid 20. A diode 294 is connected in parallel to the coil 292 of the solenoid 20.

The power MOSFET 284 is operated in the linear mode as a current source by pulling its gate at approximately 18 volts and using the resistor 288 to limit the current. This method of driving the solenoid 20 with current rather than with voltage improves the speed of response of the MOSFET. Furthermore, unlike an SCR, the MOSFET 284 is operated in a non latching mode which allows the maximum activation time of the solenoid 20 to be limited. This capability of limiting the current and maximizing the actuation time of the solenoid allows the circuit 18 to use the same solenoid coil 292 for a range of voltages without having to greatly oversize the power MOSFET 284 and to avoid potential reliability issues associated with excessive voltage and power dissipation.

The circuit 18 further includes an indicator circuit 223 to illuminate the LED 200 when an earth leakage fault is detected. The indicator circuit includes a contact switch 300 and an SCR 308 or equivalent component connected in series with the LED between +28.5 VDC at 239 and common ground 230. The cathode of the LED 200 is connected to common ground 230 through resistor 304, zener diode 306 and SCR 308. The zener diode 306 has a breakdown volt of approximately 6 volts to bias the circuit to prevent the LED from inadvertently illuminating. A filter capacitor 310 is connected in parallel to zener diode 306 for preventing the SCR 308 from triggering as a result of the very high voltage transients created when the switch 300 closes. The gate of the SCR 308 is connected to the output of comparator 270. The switch 300 is mounted within the earth leakage module 12 to engage a depending member 302 of the handle 24 (see FIG. 11).

Referring to FIG. 2, the earth leakage module 12 further includes a test circuit 309 including resistor 310 and test switch 312 connected in series between the power load lead 313 and the neutral line terminal 40. Test switch 312 is disposed in the boss 26 of the case for the earth leakage module 12. The test circuit provides a current path that bypasses the differential transformer 56 so that when the test switch 312 is closed, a current imbalance within the differential transformer is generating, thus simulating a fault condition.

In an alternative embodiment, the test circuit 309 may be remotely closed by connecting an opto-coupler 316 in parallel to test switch 312. The output portion of the opto-coupler 316 is an SCR 318 oriented to permit current flow from the power load lead 313 to the neutral line terminal 40. When the current is provided remotely to the LED input 320 of the opto-coupler 316, the SCR 318 conducts and closes the circuit which trips the circuit breakers 14,16. When the circuit breakers open, AC power is removed from the power load lead 313 and thus turns "off" the SCR 318.

In the operation of the circuit 18, the current differential transformer 56 provides a signal representative of current imbalance generated by the power line lead 204 and the neutral line lead 206 passing through the annular core 218. When the output signal of the transformer is less than a predetermined current, the output signal from the detection circuit 219 provides a low signal to an input of the nand gate 276. The nand gate 276 then generates a high output signal to the MOSFET 204 to maintain the MOSFET in the non-conductive state which prevents actuation of the solenoid 20. A low output signal from the detection circuit also prevents triggering of the SCR 308 and illumination of the LED 200.

When the output from the secondary winding 220 is greater than the predetermined current, the detection circuit 219 provides a high output signal to one input of nand gate 276. The oscillator 278 provides a periodic signal having a frequency of one to two hertz and a pulse width of approximately 10–12 msec to the other input of the nand gate 276. In response to the input signals, the nand gate provides a periodic output signal inverse of the oscillator signal which turns "on" the MOSFET 284 for approximately 10–12 msec when the signal is low. This short period of time reduces the power dissipation through the coil 292 of the solenoid 20 and prevents damages to the solenoid and MOSFET. The oscillator continues, if necessary, to provide the periodic low pulse signal from the output of the nand gate 276 until the solenoid 20 trips.

When the solenoid 20 trips the circuit breakers 14,16, the handle 24 returns to the off position as described hereinbefore. As the handle 24 begins to toggle to the off position, the depending member 320 contacts and closes the switch 300 (see FIG. 10). When the switch 300 initially closes, the output signal of the detection circuit is still high which triggers the SCR 308 to permit current to conduct through the LED 200. After the circuit breakers 14,16 open and removes the fault condition, the output signal of the detection circuit switches is low, however, the SCR continues to conduct current and maintain the LED illuminated. The LED 200 remains illuminated until switch 300 is opened by toggling the handle 24 to the "on" position.

Figure 11:
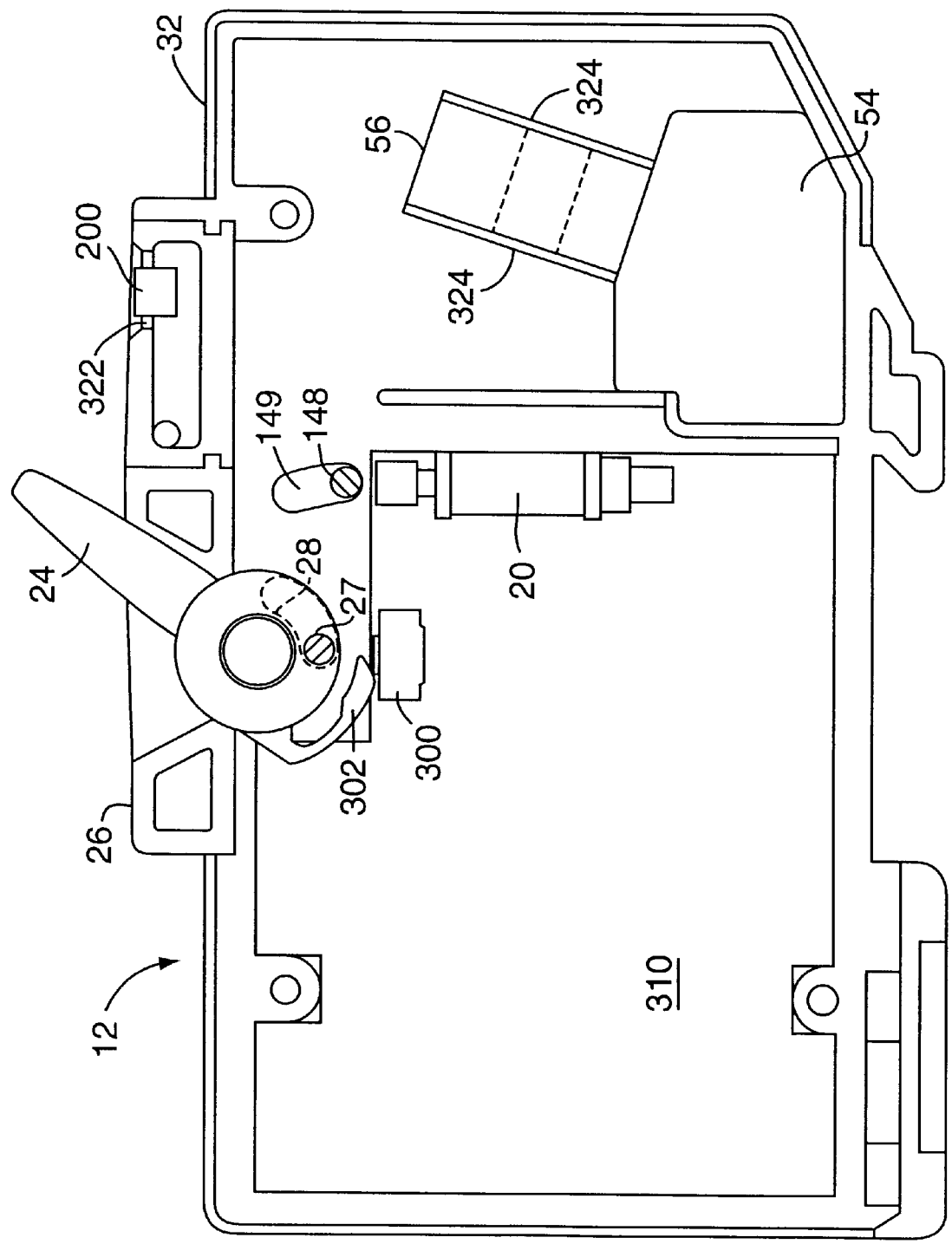
FIG. 11 is a side elevational view of the earth leakage module incorporating the present invention, with the half-case of the earth leakage module being removed to show the internal parts, the handle being shown in the "on" position.

FIG. 11 illustrates the earth leakage module having one-half of the casing removed to show the components therein. A portion of the circuit 18 is mounted to a circuit board 310 which is secured within the cavity of the casing halves 32,34 towards the load side of the circuit breaker assembly 10. A portion of the circuit board extends below the slots 28,149 in the case halves that permit the elongated bars 27,148 to extend through to the circuit breakers secured adjacent the earth leakage module 12.

Switch 300 is mounted on the circuit board 310 below the handle 24 for engagement with its depending member 310. The depending member of the handle, shown toggled in the "on" position in FIG. 11, disengages the switch 300 and thereby opens the circuit for LED 200. The LED, shown disposed in a bore 322 in the boss 26, is turned "off" when the handle is in the "on" position. When the handle 24 is rotated counterclockwise to the "off" position, the depending member 320 contacts the switch 300 to thereby close the switch which enables the LED to illuminate when an earth leakage fault is detected.

Referring to FIG. 1, the test switch 360 is mounted within a second bore disposed in the boss 26 of the other casing half of the earth leakage module.

The current differential transformer 56 is mounted between a pair of retaining walls 324, 324 disposed in the case at the portion adjacent the line terminals 40,40 of the circuit breaker assembly 10. The transformer 56 is mounted within the earth leakage module 12 at an upward angle to provide for smooth routing of the wires passing from the cutout 54 at the bottom portion of the case, through the transformer, and to the circuit board 310 and reduce the need to bend the wires sharply. The solenoid 20 is mounted to the circuit board directly below the arcuate slot 149 in the case for engaging the elongated bar 148.

As shown in FIG. 11, a portion of the detection circuit 219 is provided in an integrated circuit 326 to reduce the dimension of the circuit board 310.

Figure 12:
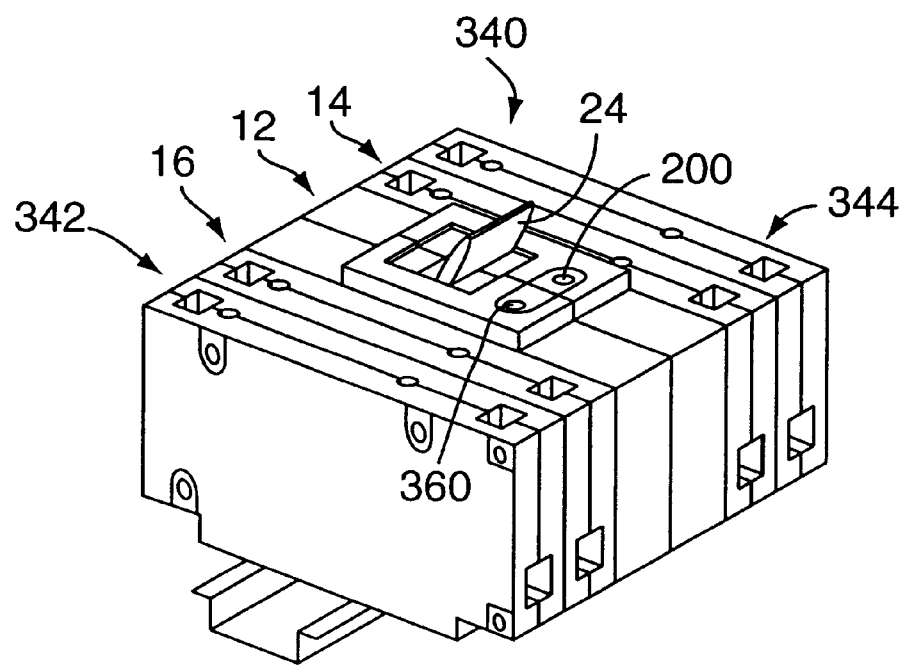
FIG. 12 is a perspective view of an alternative embodiment of the circuit breaker assembly of FIG. 1.
Figure 13:
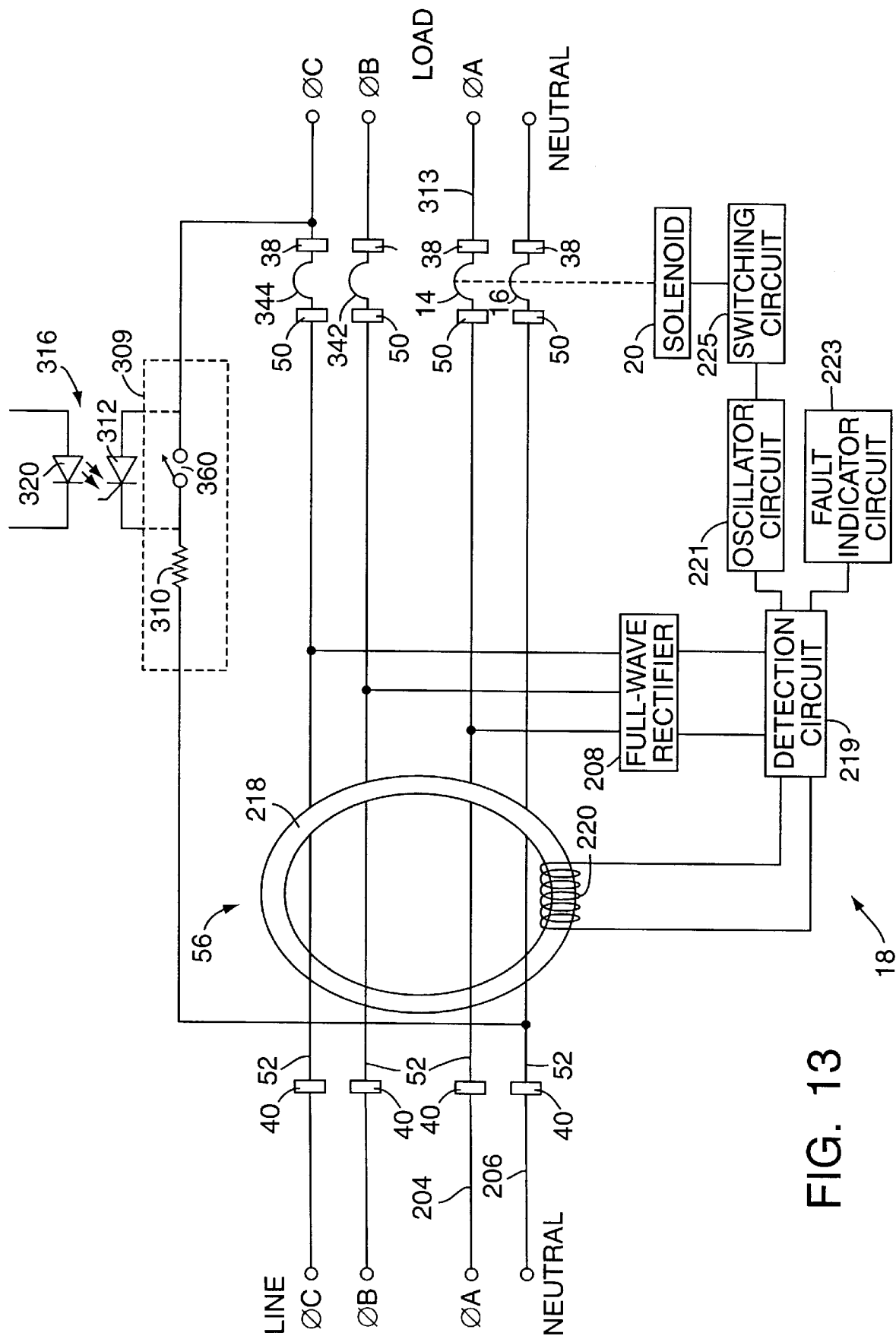
FIG. 13 is a schematic functional diagram of the alternative embodiment of the circuit breaker assembly of FIG. 12.

FIGS. 12 and 13 show an alternative embodiment of the present invention including a three phase multi-pole circuit breaker assembly 340 for a three phase power source. A pair of circuit breaker units 342,344, one for each additional phase, is attached to adjacent circuit breakers 14,16 of the single phase circuit breaker assembly 10 shown in FIG. 1. An equal number of circuit breakers are mounted adjacent each side of the earth leakage module 12 to equalize the force on the elongated bars 27,148 (see FIG. 11). The circuit breakers are substantially identical to the circuit breakers 14,16. Referring to FIG. 11, the line wires of each circuit breakers pass through the openings 54 in the cases of the circuit breakers and earth leakage module, and pass through the differential transformer 56 to the circuit board 310. Tripping of any one of the circuit breakers and detection of the earth leakage detector will trip all the circuit breakers substantially concurrently. As shown in FIG. 13, the detection circuit 18 is substantially the same as the circuit shown in FIGS. 2 and 10. The DC power for the detection circuit, however, is provided by a three-phase full-wave rectifier 350.

FIGS. 1 and 12 illustrate a single phase and three phase, multi-pole circuit breaker assemblies, respectively, however one skill in the art would recognize that a circuit breaker of the type embodying the present invention may include any number and combination of poles and phases. For example, the circuit breaker assembly may be single phase having a single pole to interrupt the power line, or may be three phase having three poles to interrupt the three power lines. One skilled in the art would also recognize that the neutral line of the AC power source may pass directly to the load through the current differential transformer 56 without having to be connected to a circuit breaker module 16.

Furthermore, in FIG. 1 circuit breaker modules 14, 16 are shown to interrupt the power line and neutral line, respectively, but one would recognize that breaker module 14 may interrupt the neutral line and breaker module 16 may interrupt the power line.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described my invention, what is claimed is:

1. An earth leakage detection unit for a circuit breaker assembly including a circuit breaker unit having a pair of cooperating contacts one of which is movable relative to the other contact for providing AC power from a power source to a load, a trip mechanism for opening the contacts; and a handle for "opening" and "closing" the contacts of the circuit breaker, said earth leakage detection unit comprising:

a solenoid for actuating the trip mechanism in response to a fault condition;

a current transformer for providing an output signal representative of the current imbalance between a power lead and a neutral lead from the AC power source that pass therethrough;

a detection circuit for providing an output signal representative of a current imbalance between the leads;

an oscillator circuit for providing a pulse train signal when the current imbalance is greater than a predetermined level; and a switching circuit for activating said solenoid in response to said pulse train signal.

2. An earth leakage detection unit, as set forth in claim 1, wherein the switching circuit includes a current source for driving said solenoid.

3. An earth leakage detection unit, as set forth in claim 2, wherein the current source is a MOSFET.

4. An earth leakage detection unit, as set forth in claim 1, wherein said detection circuit further comprises a test circuit for providing a current imbalance, said detection circuit includes a resistor and switch connected in series between the power lead and neutral lead of said current transformer.

5. An earth leakage detection unit, as set forth in claim 1, wherein said detection circuit further comprises a circuit for rectifying the AC power source.

6. An earth leakage detection unit, as set for in claim 5, wherein the rectifying circuit includes inputs connected directly to the AC power source.

7. An earth leakage detection unit, as set forth in claim 1, wherein said detection circuit further includes a circuit for providing a fault indication signal in response to a current imbalance of the leads greater than a predetermined value when the contacts are in the "open" position, said fault indication signal remains present until the contacts are in the "closed" position.

8. An earth leakage detection unit, as set forth in claim 1, wherein said detection circuit further includes a fault indication circuit that comprises a contact switch and a silicon controlled rectifier connected in series with a light emitting diode, said contact switch engageable with a depending member of the handle, said SCR conducting when said contact switch is closed and said output signal of said detection circuit is "high".

9. An earth leakage detection unit for a circuit breaker assembly including a circuit breaker unit having a pair of cooperating contacts one of which is movable relative to the other contact for providing AC power from a power source to a load, a trip mechanism for opening the contacts; and a handle for "opening" and "closing" the contacts of the circuit breaker, said earth leakage detection unit comprising:

a solenoid for actuating the trip mechanism in response to a fault condition;

a current transformer for providing an output signal representative of a current imbalance between a power lead and a neutral lead from the AC power source that pass therethrough;

a detection circuit for providing an output signal representative of a current imbalance between the leads;

a means for providing said output signal when said current imbalance is greater than a predetermined level; and a switching circuit for activating said solenoid in response to said output signal for a limited time period to enable high voltage AC power to energize said solenoid.

10. An earth leakage detection unit, as set forth in claim 9, wherein the switching circuit includes a current source for energizing said solenoid.

11. An earth leakage detection unit, as set forth in claim 10, wherein the current source is a MOSFET.

12. A trip mechanism for tripping at least one circuit breaker unit of a circuit breaker assembly, the unit having a pair of cooperating contacts one of which is movable relative to the other contact by a toggle mechanism, a tripping device responsive to current fault conditions to release the toggle mechanism, and a latch means for preventing said toggle mechanism from functioning; and a handle for actuating the toggle mechanism of the circuit breaker for "opening" and "closing" the contacts, the trip mechanism comprising:

a trip member of U-shape for the circuit breaker unit, said trip member having two legs interconnected by a cross member at one end of said legs, said cross member having an engagement means, one leg having a depending member for engaging the toggle mechanism, said trip member being pivotally attached to the toggle mechanism at the other end portions of said legs, an elongated bar extending from said engagement means of said trip member; and an actuation means for engaging said bar to pivot said trip member to disable the toggle mechanism in response to a fault condition.

13. A trip mechanism, as set forth in claim 12, wherein the elongated bar extends to each engagement means of a plurality of circuit breaker units, whereby said actuation means pivots simultaneously each trip member to disable each toggle mechanism of the circuit breaker units.

14. A trip mechanism, as set forth in claim 13, wherein the other leg of each of said trip members has a portion engageable with the toggle mechanism whereby opening of the movable contact of one of the circuit breaker units pivots the corresponding trip member and moves the bar to pivot the trip members of the other circuit breaker units to open each corresponding movable contact.

15. A trip mechanism, as set forth in claim 13, wherein the actuation means is substantially centered on the elongated bar.

16. A trip mechanism, as set forth in claim 13, wherein the actuation means comprises a solenoid for moving said elongated bar in response to a fault condition.

17. A trip mechanism, as set forth in claim 16, wherein the actuation means comprises a detection circuit that activates said solenoid in response to an earth leakage fault condition.

18. A trip mechanism, as set forth in claim 16, wherein the actuation means comprises:

a current transformer for providing an output signal representative of the current imbalance between a power lead and a neutral lead from an AC power source that pass therethrough;

a detection circuit for providing an output signal representative of a current imbalance between the leads;

an oscillator circuit for providing a pulse train signal when the current imbalance is greater than a predetermined level; and a switching circuit for activating said solenoid in response to said pulse train signal.

19. A trip mechanism, as set forth in claim 18, wherein the actuation circuit further comprises a circuit for rectifying the AC power source.

20. A trip mechanism, as set for in claim 19, wherein the rectifying circuit includes input terminals connected directly to an AC power source connected to the circuit breaker assembly.

21. A trip mechanism, as set forth in claim 18, wherein the actuation circuit further includes a circuit for providing a fault indication signal in response to a current imbalance of the leads greater than a predetermined value when the relay contacts are in the "open" position, said fault indication signal remains present until the relay contacts are in the "closed" position.

22. A trip mechanism, as set forth in claim 16, wherein the actuation means comprises:
- a current transformer for providing an output signal representative of the current imbalance between a power lead and a neutral lead from an AC power source that pass therethrough;
- a detection circuit for providing an output signal representative of a current imbalance between the leads; and
- a switching circuit for activating said solenoid in response to said output signal for a limited time period to enable high voltage AC power to energize said solenoid.

23. A trip mechanism, as set forth in claim 22, wherein the switching circuit includes a current source for driving said solenoid.

24. A circuit breaker assembly for providing AC power from a power source to a load; the circuit breaker assembly comprising:
- a toggle mechanism;
- a plurality of circuit breaker units, each unit including:
  - a pair of cooperating contacts one of which is movable relative to the other contact by said toggle mechanism,
  - a tripping device responsive to current fault conditions to release the toggle mechanism, and
  - a latch means for preventing said toggle mechanism from functioning;
- a handle for actuating the toggle mechanisms of each of the circuit breakers for "opening" and "closing" the contacts,
- a common trip mechanism comprising:
  - a trip member of U-shape for each circuit breaker unit, each of said trip members having two legs interconnected by a cross member at one end of said legs, said cross member having an engagement means, one leg having a depending member for engaging the toggle mechanism, each trip member being pivotally attached to the toggle mechanism device at the other end portions of said legs, and,
  - an elongated bar extending from said engagement means of each of said common trip members; and
- an actuation means for engaging said bar to rotate simultaneously each of said common trip members to disable each of the toggle mechanisms in response to a fault condition.

25. A circuit breaker assembly, as set forth in claim 24, wherein the other leg of each of said trip members has a portion engageable with the toggle mechanism whereby opening of the movable contact of one of the circuit breaker units pivots the corresponding trip member and moves the bar to pivot the trip members of the other circuit breaker units to open each corresponding movable contact.

26. A circuit breaker assembly, as set forth in claim 24, wherein the actuation means is substantially centered on the elongated bar.

27. A circuit breaker assembly, as set forth in claim 24, wherein the actuation means comprises a solenoid for moving said elongated bar in response to a fault condition.

28. A circuit breaker assembly, as set forth in claim 27, wherein the actuation means comprises a detection circuit that activates said solenoid in response to an earth leakage fault condition.

29. A circuit breaker assembly, as set forth in claim 27, wherein the actuation means comprises:
- a current transformer for providing an output signal representative of the current imbalance between a power lead and a neutral lead from the AC power source that pass therethrough;
- a detection circuit for providing an output signal representative of a current imbalance between the leads;
- an oscillator circuit for providing a pulse train signal when the current imbalance is greater than a predetermined level; and
- a switching circuit for activating said solenoid in response to said pulse train signal.

30. A circuit breaker assembly, as set forth in claim 29, wherein the actuation circuit further comprises a circuit for rectifying the AC power source.

31. A circuit breaker assembly, as set for in claim 30, wherein the rectifying circuit includes input terminals connected directly to the AC power source.

32. A circuit breaker assembly, as set forth in claim 29, wherein the actuation circuit further includes a circuit for providing a fault indication signal in response to a current imbalance of the leads greater than a predetermined value when the relay contacts are in the "open" position, said fault indication signal remains present until the relay contacts are in the "closed" position.

33. A circuit breaker assembly, as set forth in claim 27, wherein the actuation means comprises:
- a current transformer for providing an output signal representative of the current imbalance between a power lead and a neutral lead from an AC power source that pass therethrough;
- a detection circuit for providing an output signal representative of a current imbalance between the leads; and
- a switching circuit for activating said solenoid in response to said output signal for a limited time period to enable high voltage AC power to energize said solenoid.

34. A circuit breaker assembly, as set forth in claim 33, wherein the switching circuit includes a current source for driving said solenoid.

35. A retaining device for securing a pair of terminals within a circuit breaker; the terminals having a pair of substantially parallel contact surfaces spaced a predetermined distance apart; the circuit breaker having an opening in its casing adjacent the terminals; said retaining device comprising:
- a base;
- a post extending from an upper surface of said base;
- a pair of diametrically opposed fins extending from said post; each fin including an outer surface; said outer surfaces being spaced apart for engaging the contact surfaces of the terminals for securing the terminals to the circuit breaker; and
- a locking means for securing the retaining device to the circuit breaker.

36. A retaining device, as set forth in claim 35, wherein the base includes a ridge disposed substantially about its perimeter having outer dimensions substantially the same as the dimensions of the opening in the casing of the circuit breaker for maintaining the retaining device in a fixed position relative to the terminals.

37. A retaining device, as set forth in claim 35, wherein the locking means includes a plate disposed in the casing of the circuit breaker, said plate having an opening for receiving and securing thereto an upper portion of said post.

38. A retaining device, as set forth in claim 35, wherein the fins are generally triangular.

39. An earth leakage detection unit for a circuit breaker assembly including a circuit breaker unit having a pair of cooperating contacts one of which is movable relative to the other contact for providing AC power from a power source to a load, a trip mechanism for opening the contacts; and a handle for "opening" and "closing" the contacts of the circuit breaker, said earth leakage detection unit comprising:

a solenoid for actuating the trip mechanism in response to a fault condition;

a current transformer for providing an output signal representative of the current imbalance between a power lead and a neutral lead from the AC power source that pass therethrough;

a detection circuit for providing an output signal representative of a current imbalance between the leads; and a switching circuit for activating said solenoid in response to said output signal for a limited time period to enable high voltage AC power to energize said solenoid, said switching circuit including a means for providing an output signal when the current imbalance is greater than a predetermined value, said output signal periodically energizing said current source, whereby said solenoid is periodically energized.

\* \* \* \* \*